(12) United States Patent
Weir

(10) Patent No.: US 6,953,529 B2
(45) Date of Patent: Oct. 11, 2005

(54) APPARATUS AND METHOD OF PARTICULATE REMOVAL FROM LIQUIDS

(76) Inventor: Robert K. Weir, 2390 Forest St., Denver, CO (US) 80207

( * ) Notice: Subject to any disclaimer, the term of this patent is extended or adjusted under 35 U.S.C. 154(b) by 127 days.

(21) Appl. No.: 10/430,858

(22) Filed: May 5, 2003

(65) Prior Publication Data
US 2004/0222167 A1 Nov. 11, 2004

(51) Int. Cl.[7] .......................... B01D 33/48; B01D 35/22
(52) U.S. Cl. ...................... 210/791; 210/808; 210/248; 210/258; 210/409; 210/411; 210/416.1; 210/433.1
(58) Field of Search ................................ 210/767, 791, 210/808, 86, 97, 104, 248, 258, 409, 411, 413, 416.1, 433.1

(56) References Cited

U.S. PATENT DOCUMENTS

| 3,572,505 | A | | 3/1971 | Jongblood |
| 4,250,038 | A | | 2/1981 | Dryden |
| 4,415,462 | A | * | 11/1983 | Finch et al. ................. 210/767 |
| 4,961,864 | A | | 10/1990 | Bruke |
| 4,990,249 | A | * | 2/1991 | Leuenberger ............... 210/167 |
| 5,013,430 | A | | 5/1991 | Mileson |
| 5,197,263 | A | | 3/1993 | Midtling et al. |
| 5,378,354 | A | | 1/1995 | Poor |
| 5,531,888 | A | | 7/1996 | Geiger et al. |
| 5,587,067 | A | | 12/1996 | Love |
| 5,599,444 | A | | 2/1997 | Baron et al. |
| 5,674,386 | A | | 10/1997 | Filion |
| 6,063,296 | A | | 5/2000 | Ackerman et al. |
| 6,203,698 | B1 | | 3/2001 | Goodrich |
| 6,511,595 | B2 | * | 1/2003 | Crompton et al. .......... 210/162 |
| 6,641,720 | B1 | * | 11/2003 | Crompton et al. .......... 210/155 |
| 6,705,049 | B2 | * | 3/2004 | Esmond et al. ................ 52/16 |
| 2001/0030149 | A1 | | 10/2001 | Naddy |
| 2004/0222167 | A1 | * | 11/2004 | Weir .......................... 210/767 |

OTHER PUBLICATIONS

Hydraulic Performance of Coanda–Effect Screens, Wahl, Tony L., Jun. 2001, vol. 127, Journal of Hydraulic Engineering.

* cited by examiner

Primary Examiner—Robert James Popovics
(74) Attorney, Agent, or Firm—Ellen Reilly

(57) ABSTRACT

A method and apparatus for particulate removal from liquids is disclosed and includes a Coanda tilted wire wedge wire screen in combination with a liquid-flow velocity control orifice mounted within a cylindrical air-tight vessel that can be operated under pressure. The liquid flow velocity control orifice and Coanda tilted wire wedge wire screen in combination with the pressurized system provides for highly efficient and uniform removal of particulate matter that includes a self-cleaning feature.

32 Claims, 4 Drawing Sheets

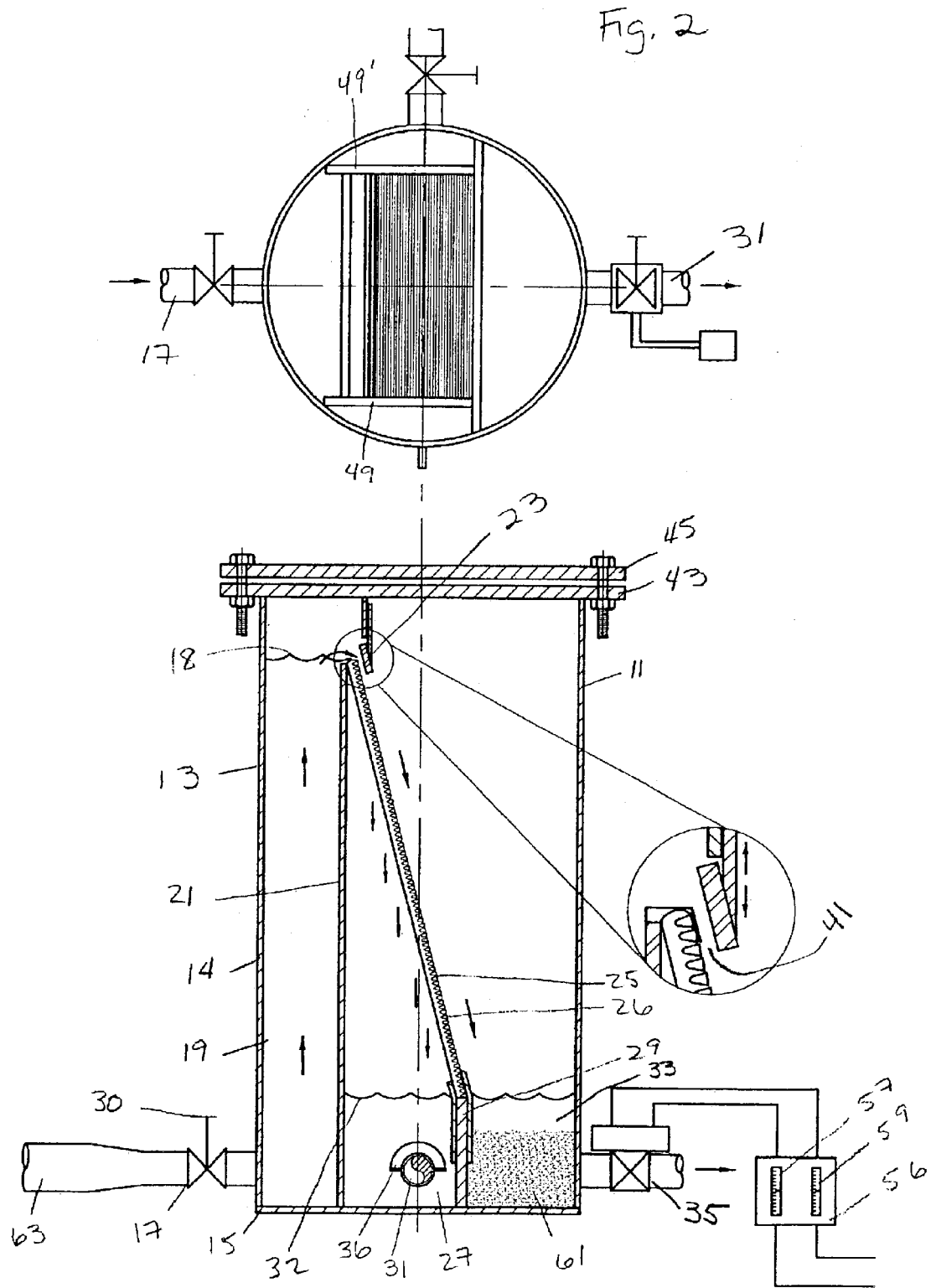

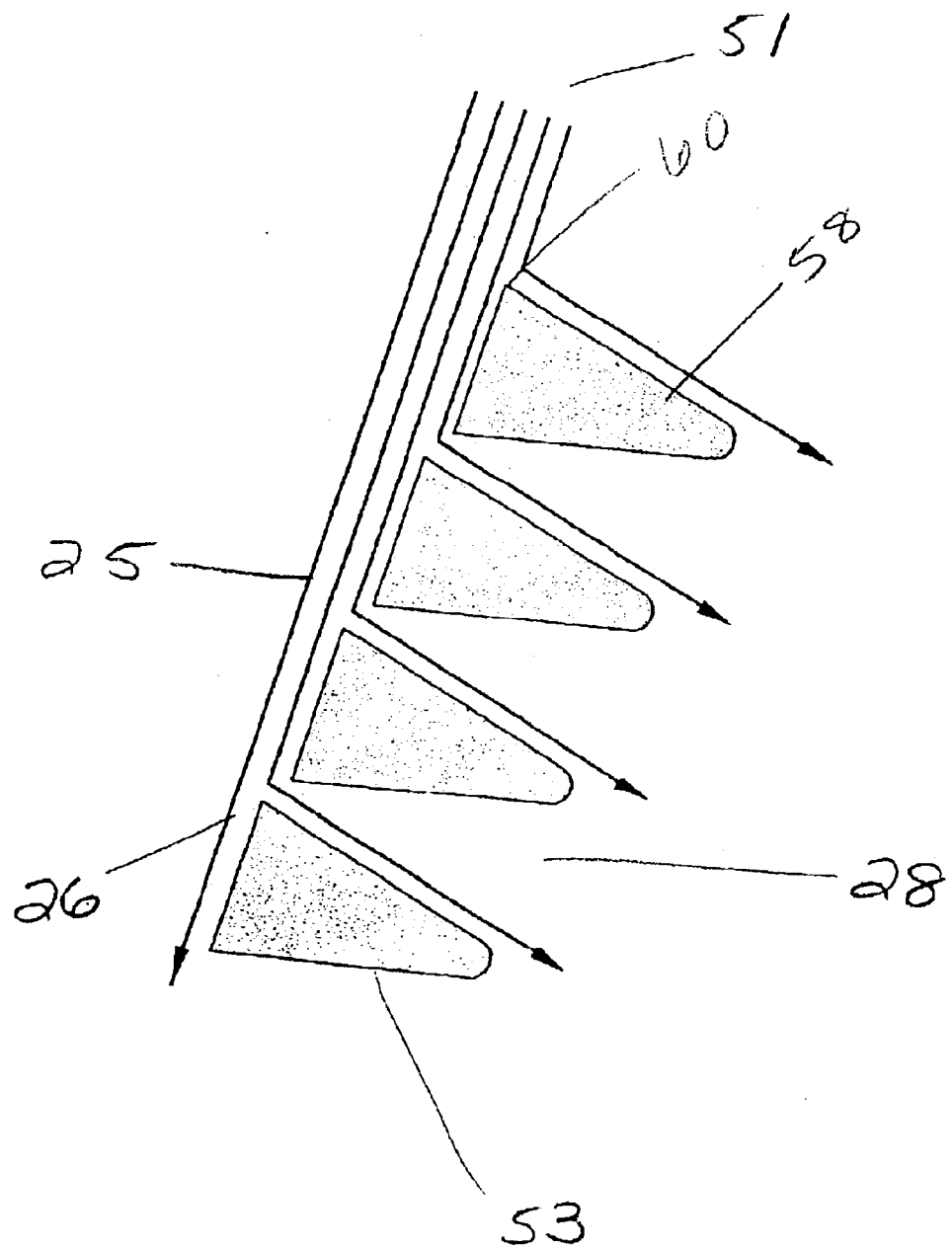

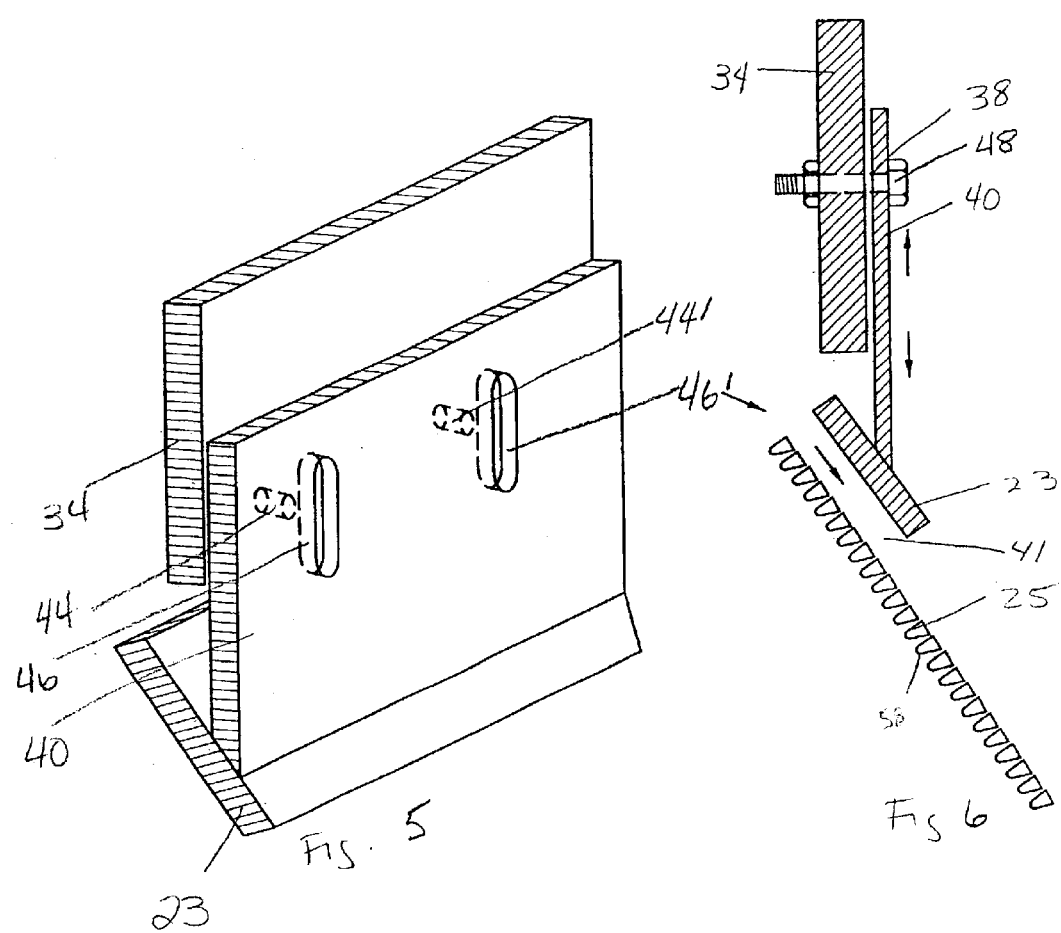

APPARATUS AND METHOD OF PARTICULATE REMOVAL FROM LIQUIDS

BACKGROUND AND FIELD OF INVENTION

The present invention relates in general to an apparatus designed to remove particulates from a liquid and, in particular, a method and apparatus for particulate removal utilizing a pressurized system in combination with a wedge wire screen filter.

Traditional filtration systems are usually made of a standard woven wire string or basket, perforated plate basket, mesh bags, granular media, sintered cartridges, centrifugal or cyclone separators. With the exception of the centrifugal and cyclone units, all of these systems operate in a submerged enclosure with particulates being trapped by the small openings or orifices in the filter element.

The submerged systems have several shortcomings: These systems all plug rapidly when heavily loaded and must be removed to be cleaned or require back flushing to remove debris and particulate. This requires substantial maintenance costs to service the submerged systems. All of these units rapidly lose filtration efficiency as debris becomes trapped in the filter and often require a high liquid pressure to function normally. Because of the thin layer of filtrate that is required to plug a normal filter element, the element must be replaced or cleaned frequently. As the process stream must not be interrupted, maintenance and cleaning often create a dangerous and unfavorable condition. Additionally, the filter element grids must be large enough to pass the liquid yet small enough to trap particulates. In some filter mediums, the uniformity of plugging is uneven resulting in areas of high velocity, plugging and breakthroughs. This inconsistent flow rate can affect the efficiency of the filtration system resulting in poor particulate removal from the liquid due to plugging and leakage.

The conventional, non-submerged systems also manifest several deficiencies: First, the liquid flow onto an inclined screen typically results in particulates becoming trapped in the filter, particularly at the upper surface area of the angled screen. This requires frequent cleaning and maintenance in order to assure efficient filtration. Non-submerged systems also tend to plug and have surface overflow, resulting in a lower efficiency and poor filtration. Further, they do not provide for uniform filtration of particulate matter.

It is desirable to provide for enhanced particulate removal, a self-cleaning filter as well as consistent velocity flow of the liquid by employing an elongated, pressure competent housing incorporating a Coanda tilted wire wedge wire screen as a filtration device which enables self-cleaning as well as the introduction of air into the system causing the filtration device to work under pressurized conditions and to regulate the water level for most effective removal of debris.

SUMMARY OF THE INVENTION

It is therefore an object of the present invention to provide for a novel and improved particulate removal apparatus adaptable for use with industrial waste water, process water and other liquid processing requiring filtration.

It is another object of the present invention to provide for a particulate removal method and apparatus operating under pressurized conditions allowing for a non-submerged system.

It is another object of the present invention to provide for a particulate removal method and apparatus that is self-cleaning and does not require frequent back washing to remove debris.

It is still another object of the present invention to provide for a particulate removal system wherein the velocity of the flowing liquid is controllable.

It is another object of the present invention to provide selective particulate removal through use of a Coanda tilted wire wedge wire screen.

A further object of the present invention is to provide for a novel and improved method of particulate removal in which the liquid is passed through a Coanda tilted wire wedge wire screen in a pressurized atmosphere.

In accordance with the present invention, a filtration system has been devised for separating particulate matter from a liquid such as wastewater, processed water, or other processed liquids. A preferred embodiment includes an elongated, pressurized housing member containing filter means, an inlet port disposed on the housing member to receive unfiltered liquid, a first baffle forming a passage in the housing member for directing the liquid from the inlet port upwardly to the filter means, collecting means for storage of debris, and discharge means for removing filtered liquid from the housing member. The housing member can be operated in a pressurized piping system while the liquid level within the housing can be controlled so that the filter means can be operated in a non-submerged state.

A method of particulate removal is also provided utilizing an air-tight housing member, pressurizing the housing member through introduction of air, directing liquid from an inline conduit to an inlet port disposed on the lower end of the housing member, forcing liquid through the inlet port and upwardly through an influent passage through a velocity orifice then downwardly by pressure or under gravity across a filter in order to remove particulate matter from the liquid, catching and draining filtered liquid from the housing.

There has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a side elevational view of the device;

FIG. 2 is a top plan view with ceiling plates removed to show the top of the wedge wire screen;

FIG. 4 is a schematic view illustrating the path of liquid flow through the Coanda tilted wire wedge wire screen of the device;

FIG. 5 is a side perspective view of the velocity orifice plate and support plates; and FIG. 6 is a cross-sectional side view of the velocity orifice.

DETAILED DESCRIPTION OF PREFERRED EMBODIMENT

Figure 3:
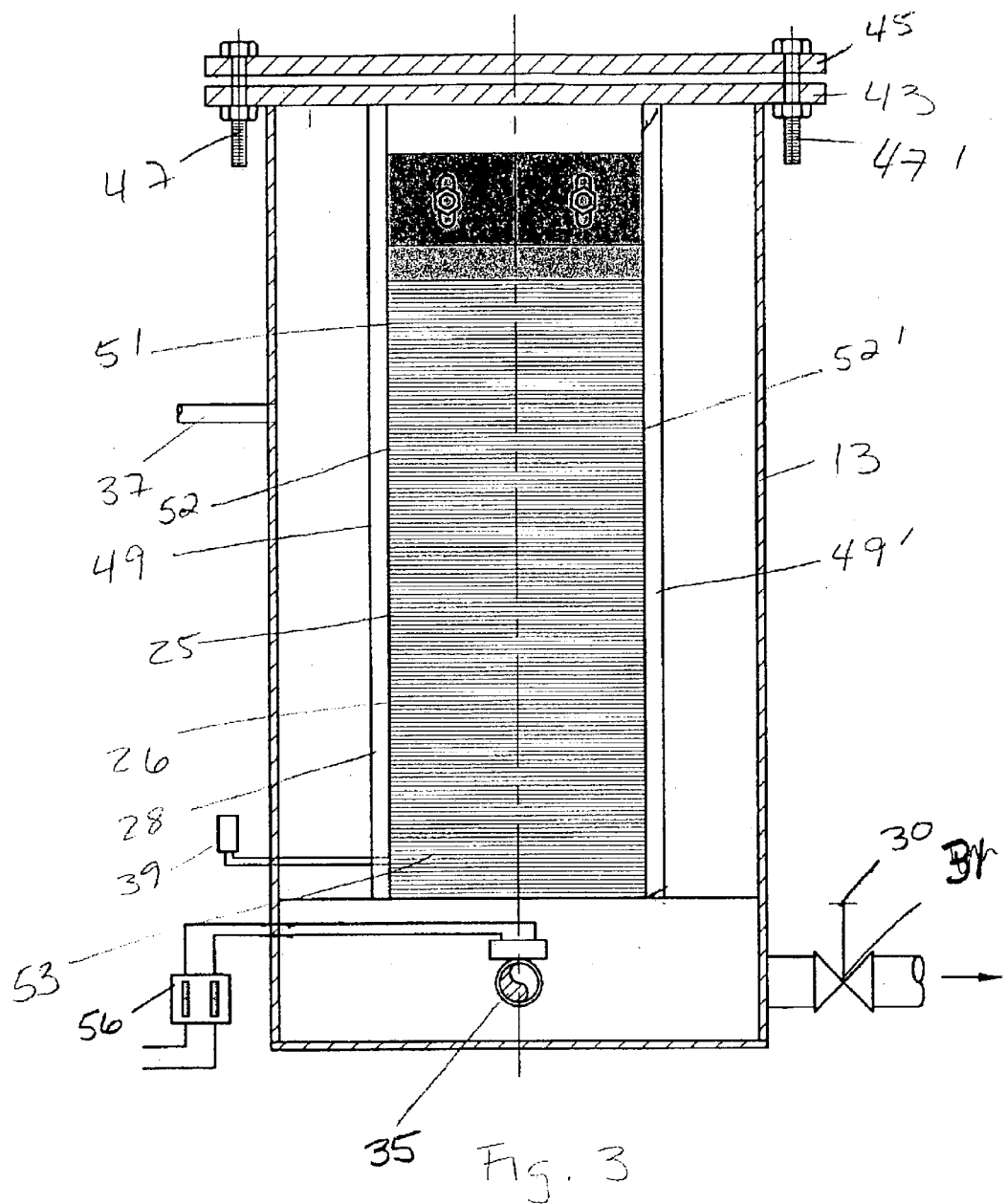
FIG. 3 is a front view in elevation of the device.

In accordance with the present invention, a highly effective liquid filtration system for industrial waste water treatment or similar types of liquid filtration is provided. Referring now to FIGS. 1 through 6, a preferred apparatus 11 according to the present invention is broadly comprised of an elongated vessel 13 made up of bottom plate 15, top ceiling plates 43, 45 and elongated pipe or casing 14. Gas, preferably air, is introduced into the vessel 13 through gas inlet valve 37, as seen in FIG. 3. This gas is used to control the liquid level within the pressurized vessel, the vessel 13 also having gas relief valve 39, allowing for removal of gas from the pressurized vessel in the event that excess gas is present within the vessel 13. The vessel 13 may also include a liquid level sensor 30 which serves to determine the level of liquid present in the vessel 13.

Referring back to FIG. 1, waste water, process water or a liquid to be filtered is introduced into the vessel 13 through inlet valve or port 17 which allows liquid to pass into influent passage 19 in the casing 14 which is formed by a first baffle 21. The liquid pressure is preferably in the range of 30–100 psi, although it can be higher if necessary. The inlet port 17 may be connected inline to a water or liquid conduit 63 for industrial waste or process liquids. The influent passage 19 also includes the bottom plate 15 which forms a receptacle or container for the liquid with open end 18. Due to the design of the influent passage 19, liquid flows upwardly through the influent passage 19, passes through liquid flow orifice 41, which will be described in greater detail, then passes along screen surface 26 of filtration screen 25, which may be comprised of a Coanda tilted wire wedge wire screen. This will also be described in greater detail at a later point. As shown in FIG. 2 and FIG. 3, side plates 49 and 49' prevent liquid from spilling over screen edges 52, 52', thereby confining liquid flow along the screen surface 26.

The liquid containing particulate matter flows under gravity or is jetted over the screen surface 26. Particulate matter greater than a determinate size does not pass through the screen 25 and is temporarily retained on the screen surface 26. Liquid with particulate matter removed, i.e., filtered liquid, passes through the screen 25 downwardly into effluent passage 27. The effluent passage 27 contains air shield 36 which is preferably plastic moulded into an arc or semicircular wedge that may be attached to an upper portion of effluent port 31, preventing gas bubbles from becoming entrained in the filtered liquid and passing through the effluent port 31. Due to pressurization, some liquid becomes super-saturated with gas and as liquid flows through the screen 25 and into the effluent container 27, it strikes the surface of liquid level 32, physically creating air bubbles. The air shield 36 prevents these entrained gas bubbles from escaping through the effluent port 31, thereby maintaining a constant fluid level within the vessel 13. The filtered liquid will exit the vessel 13 through the effluent port 31. Particulate matter or debris 61 trapped on the screen surface 26 is collected in debris storage receptacle 33 for later removal through purge valve 35.

Referring to FIGS. 5 and 6, liquid flow control plate 23 is preferably made of a metal substance, such as, stainless steel but may also be made up of a plastic or plastic-like substance. The plate 23 is located on an upper end of the screen 25 creating a liquid flow control orifice 41 between the screen surface 26 and the plate 23. The plate 23 is preferably rectangular in shape with an adjustable setting 38. The adjustable setting 38 comprises a rear support member 34 having at least two holes 44, 44' bored through the rear member 34. There is a corresponding front support member 40 with larger corresponding openings 46, 46' to receive a screw 48 or similar device inserted through the front support member 40 as well as the rear support member 34. The larger openings 46 and 46' permit the front support member 40 and the attached control plate 23 to be raised or lowered, thereby increasing or decreasing, respectively, the area of the orifice 41, while the rear support member 34 remains stationary.

Raising the control plate 23 increases the height and cross-sectional area of the orifice 41, thereby decreasing the velocity of the liquid. A decrease in the cross sectional area of the orifice 41 increases the velocity of the liquid. The function of the orifice 41 is to provide for controlled velocity of the liquid as it passes onto the screen surface 26. Where greater flows are required through the apparatus 11, the influent passage 19 can be closed and sealed with the exception of the orifice 41 created by the control plate 23 and the screen surface 26. The quantity of liquid that a given area of the screen 25 will pass is a function of the velocity of the liquid flowing over the screen surface 26. While the velocity created by the acceleration due to gravity is usually adequate, reducing the cross sectional area of the orifice 41 will enhance the capacity and efficiency of the screen 25 by increasing the velocity of the liquid contacting the screen surface 26. Care should be taken to assure that the orifice 41 is larger than all of the particulates to be filtered out.

Referring back to FIG. 1, the screen 25 is placed diagonally across the effluent passage 27 and with respect to the first baffle 21. The plane of the screen 25 is tilted at an angle in the range of 35° to 70°, dependent upon the function of the screen. The screen 25 is supported by lower screen support baffle 29 and the first baffle 21. The support baffle 29, horizontal side plates (not shown), and the first baffle 21 form the effluent passage 27 and allow filtered liquid to remain in the effluent passage 27. The horizontal side plates extend horizontally, and the debris storage receptacle 33 is separated from the effluent passage 27 by the support baffle 29 and is designed to store particulate matter for later removal through purge valve 35.

FIG. 4 is an exploded schematic view of a Coanda tilted wire wedge wire screen 25. The Coanda tilted wire wedge wire screen 25 has the screen surface 26, a lower surface 28, an upper portion of the screen 51 and a lower portion of the screen 53. See also FIG. 3. The Coanda screen 25 includes walls or wires 58 that are tilted and wedge-shaped extending chordally in spaced relation along the screen surface 26. The screen is manufactured of small stainless steel wedge-shaped wires 58 that are either tungsten, inert gas, or resistance welded to supporting rods or bars located in a plane beneath the indexed and tilted wires 58. The screen 25 may also be manufactured using plastic or plastic-like substances. Although the angle of tilt on the wire 58 is variable, optimal tilt is approximately 5°, although a tilt of between 3° to 10° would be the approximate range of tilt. The function of the tilted wire 58 is to create an exposed shearing plane along a leading edge 60 of the wire that will shear a layer of the liquid that is flowing across the surface of the screen surface 26. It is important to have sharp, upstream edges 60 on the wires 58, in order to have effective shearing. Particulates that are entrained in the liquid continue down the screen surface 26. The Coanda screen is described in an article titled "Hydraulic Performance of Coanda-Affect Screens" by Tony Wahl, for publication in the Journal of Hydraulic Engineering, Volume 127, No. 6, June 2001, the entire contents of which are expressly incorporated herein by reference as if set forth in full. As described in Wahl, the Coanda-effect screens utilize a tilted wire screen panel which produces shearing offsets into the flow above the screen. The shearing action is enhanced by the fact that flow remains attached to the top surface of each wire 60, and is thus directed into the offset created by the next downstream wire. See FIG. 4. This attachment of the flow to the top surface 60 of each wire 58 is an example of the Coanda effect, the tendency of a liquid jet to remain attached to a solid flow boundary. The placement of the wires 58 are horizontal and perpendicular to the flow across the screen. Gravity accelerates the liquid as it moves down the face of the screen 26 and the shearing action is proportional to the velocity of the liquid flow.

FIG. 3 details further components of the apparatus. The vessel 13 in combination with the securing plates 43, 45, results in a pressure competent system. Pressurized gas may be introduced through the gas inlet valve 37. Such pressurized gas is used to control the liquid level within, the apparatus, thus preventing the screen element from being flooded or submerged. Once the plates 43 and 45 are secured using securing devices 47, 47', gas may be introduced through the gas inlet valve 37 and, if desired, gas may be released through the gas relief valve 39. The vessel 13 may also contain the liquid level sensor 30 located preferably on the inlet port 17 or the effluent port 31 or both, to indicate the level of fluid within the housing, to prevent submersion of the screen 25. Flow passing through the screen 25 is collected in the effluent container 27 beneath the screen 25, while overflow, particulate matter 61 pass off the lower end 53 of the screen into the debris chamber 33. Flow velocities across the screen 25 are typically 2 to 3 meters per second depending upon the setting of the control plate 23 or the velocity due to acceleration of the fluid by gravity (32 ft./sec./sec.), increasing toward the toe or lower end of the screen 53.

The screen face 26 is kept "dry" through the introduction of gas into the vessel 13 through the gas inlet valve 37. The critical variable for the operation of the system is to control or regulate the level 32 of liquid in the pressurized effluent container 27. If the liquid level 32 in the effluent container 27 covers the screen surface 26, it will operate in a conventional, submerged mode and plug as liquid passes between the wires 58. There must also be excess gas in the vessel 13 so that the critical liquid level 32 can be maintained by simply releasing gas from the housing member through the gas relief valve 39 or adding gas through the gas inlet valve 37. If the screen surface 26 should ever become submerged it will be backwashed by the flow of liquid from the back side 28 of the screen 25, through the screen surface 26 and out through the purge valve 35.

In certain operations of the unit it may be desirable to automate the debris removal process. This can be accomplished by putting a valve operator 56 including valve operators sold under the trademark ASCO® owned by Automatic Switch Company, Inc., to control the on/off cycles of the purge valve 35. The purge valve 35 is a typical commercial valve such as an Asco® solenoid valve. The valve operator 56 can be either electric or pneumatic and is driven by cycle timer 57 and duration timer 59. A typical operation would be to set the cycle timer 57 for one-hour intervals and the duration timer 59 for a 30-second interval. Each hour the purge valve 35 would open for a period of 30 seconds. During this 30-second period of time the debris 61 would be flushed out to waste. At the end of the 30 second time interval the purge valve 35 would close and the apparatus 11 would return to normal operation.

Another method of washing the screen surface 26 to remove debris is to close the effluent port 31 and open the purge valve 35 which creates a pressure that keeps the liquid from going through the screen 25. The liquid on the screen surface 26 will wash debris 61 from the screen face 26 and down into the debris receptacle 33 of the vessel 13. The debris 61 can then be removed from the debris receptacle 33 through use of the purge valve 35 which can be operated manually or on a timed interval.

It is therefore to be understood that while preferred forms form of invention are herein set forth and described, various modifications and changes may be made therein without departing from the spirit and scope of the present invention as defined by the appended claims and reasonable equivalents thereof.

I claim:

1. Apparatus for separating particulate matter from liquid comprising:

an elongated housing member;

filter means comprising a tilted screen disposed within said housing member;

an inlet port for introducing the liquid to be filtered into said housing member;

first baffle means extending vertically from a lower end of said housing member upwardly to an upper end of said filter means whereby to direct the flow of liquid from said inlet port upwardly to said upper end of said filter means for downward flow along and through said filter means;

collecting means for collecting particulate matter separated by said filter means;

discharge means for removing filtered liquid from said housing member; and pressurizing means for introducing gas under pressure into said housing member.

2. The apparatus according to claim 1 wherein said upper end of said filter means includes liquid flow control means to control the rate of flow velocity, depth and width of liquid stream flowing across said filter means.

3. The apparatus according to claim 1 wherein said filter means comprises a Coanda tilted wire wedge wire screen.

4. The apparatus according to claim 3 wherein said Coanda tilted wire wedge wire screen is formed of wedge shaped wires extending chordally in spaced relation to one another.

5. The apparatus according to claim 3 wherein said Coanda tilted wire wedge wire screen extends diagonally along the substantial length of said housing.

6. The apparatus according to claim 1 wherein said filter means includes first and second side panels to prevent liquid from escaping along first and second sides of said filter means.

7. An apparatus according to claim 1 wherein said collecting means includes a debris receptacle disposed at said lower end of said housing member and including second baffle means extending vertically from a base portion of said housing member upwardly to a lower end of said filter means whereby to partially support said filter means and to provide separation between said debris receptacle and an effluent passage.

8. The apparatus according to claim 7 wherein said first and second baffle means partially define said effluent passage.

9. The apparatus according to claim 7 wherein said housing member includes a liquid level sensor disposed within said effluent passage.

10. The apparatus according to claim 7 wherein said effluent passage includes deflector means whereby to prevent entrained air from escaping through said discharge means.

11. The apparatus according to claim 7 wherein said debris receptacle includes purge means for removing particulates from said debris receptacle.

12. The apparatus according to claim 11 wherein said purge means includes a valve operator to automatically or manually cycle and remove debris from said debris receptacle.

13. The apparatus according to claim 1 wherein said discharge means includes an attached level sensor to monitor the level of liquid exiting said housing member.

14. The apparatus according to claim 1 wherein said pressurizing means includes a gas inlet valve.

15. The apparatus according to claim 1 wherein said housing member includes a gas relief valve.

16. An apparatus according to claim 1 wherein said inlet port includes an attached pressure sensor to monitor the level of liquid within said housing member.

17. Apparatus for separating particulate matter from liquid comprising:
   an elongated housing member;
   a Coanda tilted wire wedge wire screen disposed within said housing member;
   an inlet port disposed on said housing member, said inlet port receiving liquid to be transported into said housing member;
   an outlet port disposed on said housing member, said outlet port transporting filtered liquid out of said housing member;
   said screen including liquid flow control means disposed on an upper portion of said screen whereby to control and direct the flow of liquid on to a surface of said screen;
   first baffle means for directing the flow of liquid within said housing member upwardly to said upper portion of said screen and downwardly through said flow control means;
   a debris receptacle disposed at a lower end of said screen including second baffle means to partially support said screen and to partition said debris receptacle from an effluent vessel;
   purge means for transporting particulates from said debris receptacle; and
   pressurizing means for introducing gas under pressure into said housing member.

18. The apparatus according to claim 17 wherein said housing member is defined by cylindrical sides, a bottom and a top resulting in a pressure competent system.

19. The apparatus according to claim 17 wherein said housing member includes pressurizing means whereby to introduce gas into said housing member.

20. The apparatus according to claim 17 wherein said effluent vessel is disposed between said first and second baffle means at the lower end of said housing member.

21. The apparatus according to claim 17 wherein said effluent vessel includes deflector means whereby to prevent entrained air from escaping through said outlet port.

22. The apparatus according to claim 17 wherein said liquid flow control means is defined by an adjustable plate in combination with said upper portion of said screen.

23. The apparatus according to claim 17 wherein said pressurizing means includes a gas inlet valve.

24. The apparatus according to claim 17 wherein said housing member includes a liquid level sensor disposed within said housing member.

25. The apparatus according to claim 17 wherein said housing member includes a pressure relief valve through which constrained gas is allowed to pass.

26. A method of filtering liquids wherein an inline liquid conduit is attached to an airtight, pressurized housing member through an inlet port, an outlet port, and a filtration member disposed within said housing member comprising the steps of:
   pressurizing said housing member with air;
   directing liquid from said inline conduit to said inlet port;
   forcing liquid into said inlet port and upwardly to an upper edge of said filtration member;
   controlling the rate of flow and velocity of liquid passing through a liquid flow control means;
   directing liquid downwardly under gravity over an upper surface of said filtration member and through said filtration member;
   catching filtered liquid in an effluent vessel; and
   transporting filtered liquid from said effluent vessel through said outlet port.

27. The method according to claim 26 wherein the steps further comprise:
   storing particulates collected on a surface of said filtration member in a debris receptacle.

28. The method according to claim 26 wherein the steps further comprise:
   removing particulates from said debris receptacle through a purge valve.

29. The method according to claim 26 wherein the steps further comprise:
   deflecting filtered liquid within said effluent vessel to prevent air from becoming entrained in filtered liquid.

30. The method according to claim 26 wherein the steps further comprise:
   forcing liquid contained in said effluent vessel through an underside of said filtration member in order to remove trapped particulate matter from a surface of a filtration member.

31. The method according to claim 26 wherein the steps further comprise:
   automatically or manually removing trapped particulates from said debris receptacle through a valve operator disposed on said purge valve.

32. The method according to claim 26 wherein the steps further comprise:
   regulating a level of liquid within said housing.

* * * * *